March 10, 1925.  1,528,918
F. E. FLADER
PNEUMATIC SHOCK ABSORBER
Filed March 21, 1923
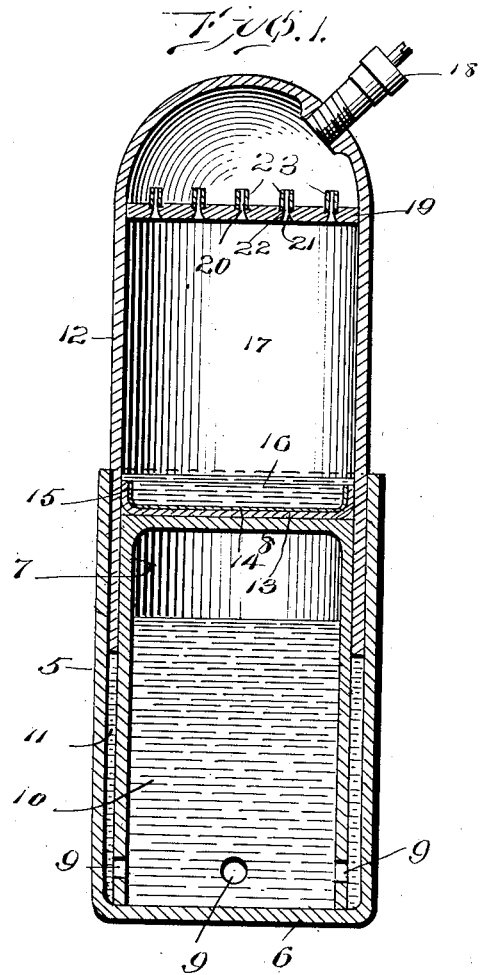
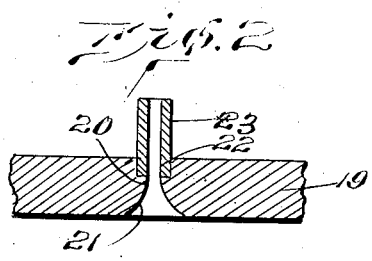
Inventor
Fredric E. Flader,
By Robert H. Young
Attorney Patented Mar. 10, 1925.

1,528,918

UNITED STATES PATENT OFFICE.

FREDRIC E. FLADER, OF DAYTON, OHIO.

PNEUMATIC SHOCK ABSORBER.

Application filed March 21, 1923. Serial No. 626,571.

*To all whom it may concern:*

Be it known that I, FREDRIC E. FLADER, a citizen of the United States, residing at Dayton, in the county of Montgomery and State of Ohio, have invented certain new and useful Improvements in Pneumatic Shock Absorbers, of which the following is a specification.

This invention relates to shock absorbers and particularly pneumatic shock absorbers.

The object of the invention is to produce a highly efficient pneumatic shock absorber adapted to support the entire load of a vehicle upon a body of compressed air, either in conjunction with or independent of the usual body supporting springs.

A further object of the invention, and one of the main features thereof, resides in special means for counteracting the rebound of the vehicle body after a sudden depression or downward movement of the body.

By means of the construction herein described, the pneumatic shock absorber may be substituted for the usual vehicle body supporting springs or in place of the shock-absorbing springs used in the undercarriage of an aircraft or the improved pneumatic shock absorber may be used in conjunction with such body supporting springs.

With the above and other objects in view, the invention consists in the novel construction, combination and arrangement herein fully described, shown and claimed.

In the accompanying drawings.

Figure 1 is a vertical diametrical section through the improved pneumatic shock absorber.

Figure 2 is an enlarged fragmentary section taken through the partition or diaphragm of the cylinder and through one of the ports of orifices thereof.

It is to be understood that one or more of the shock absorbers may be used on any vehicle or aircraft according to requirements. It is however, necessary to described only one of such shock absorbers. The device comprises a cylinder casing 5 closed at one end (usually the lower end) by an end wall 6, said casing 5 being left open at its other end, as shown in Figure 1.

Within the casing 5 is what may be termed a stationary piston 7, the lower end of which is shown open, and the upper end of which is closed by a head 8. Piston 7 is united at its lower edge to the end wall 6 of the casing 5 in any suitable way, and said piston is provided adjacent to the lower portion thereof with one or more vents or holes 9 to permit liquid, such as oil, indicated at 10, to be introduced into the casing 5 and within the piston 7 and in the annular space 11 between the piston 7 and the casing 5.

The annular space 11 between the piston 7 and casing 5 is just sufficient to admit of a close sliding fit between said parts and cylinder 12, the skirt of which is movable between the piston and casing and submerged for a short distance in the body of oil 10, as is clearly indicated in Figure 1. In this way an absolutely fluid tight seal is established between the cylinder 12, piston 7 and the casing 6.

On the head 8 of the piston 7 there is placed a cupped washer 13 of leather or other flexible material, in conjunction with which a spring expansion disk 14 is used, the same being flanged at 15 to bear resiliently against the cupped portion of the washer 13, thereby holding the peripheral portion of the washer snugly against the inner surface of the cylinder 12. A body of oil indicated at 16 is placed in the cupped washer 16 to prevent air leakage to the outer atmosphere between the cylinder and the casing 5.

The interior of the cylinder 12 above the piston 7 forms a compressed air chamber 17, into which air is forced under pressure through a suitable inflating valve 18, similar to that used in connection with the inner device of pneumatic tires. The air is compressed in the chamber 17 to an extent which will form an efficient support for the vehicle body or such portion thereof as is imposed on the shock absorber.

The compressed air chamber 17 is divided into upper and lower compartments by means of a partition or diaphragm 19. This diaphragm may be arranged at any desired point in the length of the compressed air chamber 17 and it is formed with one or more ports or orifices 20 extending therethrough. Each port or orifice 20 has a flared or bell-shaped mouth or entrance 21, preferably disposed toward the piston 7, the other end of the port being of reduced size and capacity as indicated at 22. An extension tube or nipple 23 is secured to the diaphragm 19 and projects from the smaller end of the port or orifice 20, into the upper compartment of the compressed air chamber 17. This is clearly shown in Figure 1 while Figure 2 illustrates one of the ports or orifices in detail.

The operation of the shock absorber is as follows: Assuming that the casing 5 is attached to the running gear of a vehicle and that the weight of the body is supported upon the cylinder 12, it will be observed that the load of the vehicle body is supported by the body of compressed air in the chamber 17. When an unusual shock is experienced, the piston 7 is forced upwardly, further compressing the air in the chamber 17 and forcing it through the orifices 20 into the upper compartment of the air chamber above the partition 19. After the shock, the air in the upper compartment will pass in the opposite direction through the orifices 20, forcing the piston 7 back to its normal position. The air on the up-stroke of the piston passes quickly through the orifices 20 due to the enlarged lower portions thereof. The air on the return stroke is retarded to a great extent because of the small opening at the top of the orifice and because of the small tubes or nipples which project into the upper compartment of the compressed air chamber. The object of the construction, arrangement and operation above described is to allow the air to be compressed quickly into the upper compartment, from which it cannot escape too rapidly so that an excessive rebound is not experienced. The operation of the cupped washer and its spring disk and the body of oil 16 covering them is to form a tight joint so that the air under high pressure will not leak between the walls of the piston and cylinder. The oil in the lower part of the shock absorber forms an additional seal around the lower end of the piston to prevent air leakage to the outer atmosphere between the cylinder walls and the casing 5.

I claim:

A pneumatic shock absorber embodying a cylinder, a piston therein, and a wall dividing said cylinder provided with a plurality of ports larger at one end than at the other end to permit air to flow therethrough with greater rapidity in one direction than the other.

In testimony whereof I affix my signature.

FREDRIC E. FLADER.